United States Patent
Duda

(10) Patent No.: US 9,621,508 B2
(45) Date of Patent: Apr. 11, 2017

(54) SYSTEM AND METHOD FOR SHARING VXLAN TABLE INFORMATION WITH A NETWORK CONTROLLER

(71) Applicant: Arista Networks, Inc., Santa Clara, CA (US)

(72) Inventor: Kenneth James Duda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 693 days.

(21) Appl. No.: 13/971,210

(22) Filed: Aug. 20, 2013

(65) Prior Publication Data

US 2015/0058470 A1 Feb. 26, 2015

(51) Int. Cl.
*H04L 29/12* (2006.01)
*H04L 12/46* (2006.01)

(52) U.S. Cl.
CPC ........ *H04L 61/103* (2013.01); *H04L 12/4633* (2013.01); *H04L 12/4641* (2013.01); *H04L 61/6009* (2013.01)

(58) Field of Classification Search
CPC ............. H04L 12/4633; H04L 12/4641; H04L 41/082; H04L 61/103; H04L 61/6009
See application file for complete search history.

(56) References Cited

U.S. PATENT DOCUMENTS

| 9,043,638 B1* | 5/2015 | Su ......................... G06F 11/073 714/6.1 |
| 2003/0152092 A1* | 8/2003 | Lu ..................... H04L 29/12009 370/408 |
| 2013/0322453 A1* | 12/2013 | Allan ................... H04L 12/4662 370/395.53 |
| 2014/0119379 A1* | 5/2014 | Liang .................. H04L 12/4625 370/401 |
| 2014/0185616 A1* | 7/2014 | Bloch ................. G06F 9/45533 370/392 |

(Continued)

OTHER PUBLICATIONS

Mahalingam, M., Dutt, D., Duda, K., Agarwal, P., Kreeger. L., Sridhar, T., Bursell, M.and Wright, C; "VXLAN: A Framework for Overlaying VirLualized Layer 2 Networks over Layer 3 Networks" Version 04; May 8, 2013 (22 pages).*

Mahalingam, M., Dutt, D., Duda, K., Agarwal, P., Kreeger. L., Sridhar, T., Bursell, M.and Wright, C; "VXLAN: A Framework for Overlaying Virtualized Layer 2 Networks over Layer 3 Networks" Version 04; May 8, 2013 (22 pages).

*Primary Examiner* — Michael C Lai
(74) *Attorney, Agent, or Firm* — Osha Liang LLP

(57) ABSTRACT

A method and system for sharing host entries between virtual tunnel endpoints (VTEPs). The method includes making a first determination that an NLHE is present in a locally learned host entry table on a VTEP where the NHLE is associated with a first timestamp, and making a second determination that a first entry corresponding to the NHLE is present in a Host-Specific Portion of Global Host Entry Table (HSPT) on the VTEP, where the first entry is associated with a second timestamp. Based on the second determination, making a third determination, using the timestamps, that the NHLE is more recent than the first entry and based on the third determination updating an active forwarding table on the first VTEP to include a second entry corresponding to the NHLE and to remove the first entry and sending the NHLE to a VXLAN controller operatively connected to the VTEP.

16 Claims, 19 Drawing Sheets

(56) References Cited

U.S. PATENT DOCUMENTS

| | | | |
|---|---|---|---|
| 2015/0003458 A1* | 1/2015 | Li | H04L 45/507 370/392 |
| 2015/0003463 A1* | 1/2015 | Li | H04L 45/507 370/395.53 |
| 2015/0009992 A1* | 1/2015 | Zhang | H04L 49/354 370/392 |
| 2015/0030024 A1* | 1/2015 | Venkataswami | H04L 45/74 370/392 |
| 2015/0063102 A1* | 3/2015 | Mestery | H04L 41/12 370/230 |
| 2015/0103692 A1* | 4/2015 | Jain | H04L 41/0806 370/254 |
| 2015/0124820 A1* | 5/2015 | Alizadeh Attar | H04L 47/50 370/392 |
| 2015/0124823 A1* | 5/2015 | Pani | H04L 12/18 370/392 |
| 2015/0163192 A1* | 6/2015 | Jain | H04L 61/103 370/255 |
| 2015/0244617 A1* | 8/2015 | Nakil | H04L 43/04 709/224 |
| 2015/0304117 A1* | 10/2015 | Dong | H04L 12/185 370/312 |

* cited by examiner

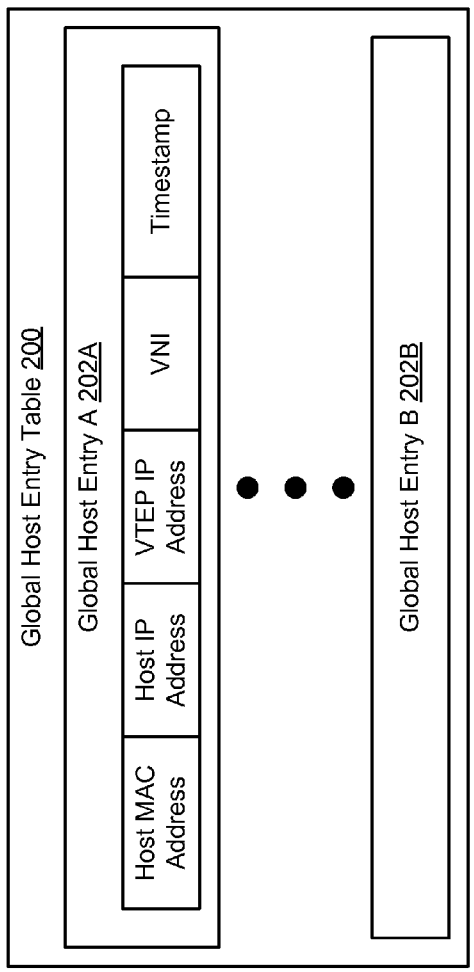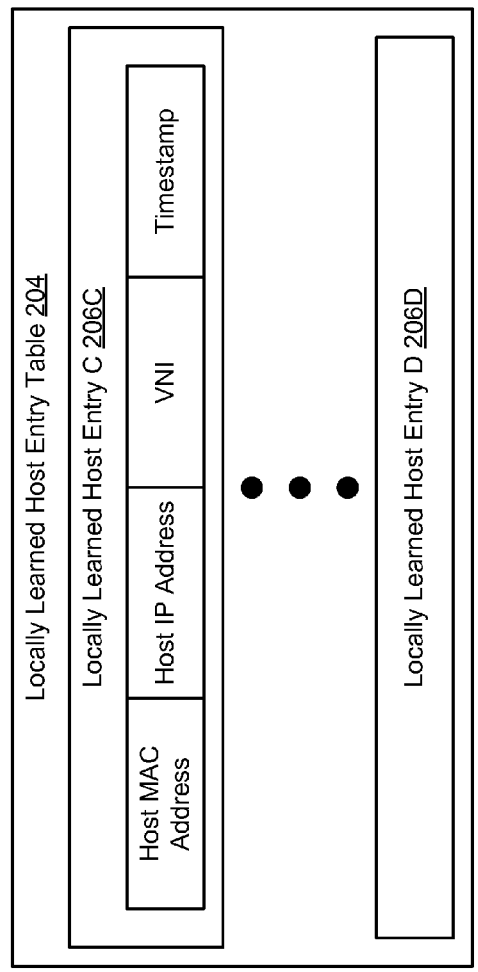
FIG. 2A
FIG. 2B

Local Learned Host Entry Table – VTEP 1

| VM 1 MAC | VM 1 IP | VNI 1 | T1 |
|---|---|---|---|

Host-Specific Portion of Global Host Entry Table (HSPT) – VTEP 1

| VM 1 MAC | VM 1 IP | VTEP 1 IP | VNI 1 | T1 |
|---|---|---|---|---|
| VM 3 MAC | VM 3 IP | VTEP 3 IP | VNI 1 | T3 |

FIG. 8B

Local Learned Host Entry Table – VTEP 2

| VM 2 MAC | VM 2 IP | VNI 2 | T2 |
|---|---|---|---|

Host-Specific Portion of Global Host Entry Table (HSPT) – VTEP 2

| VM 2 MAC | VM 2 IP | VTEP 2 IP | VNI 2 | T2 |
|---|---|---|---|---|
| VM 4 MAC | VM 4 IP | VTEP 4 IP | VNI 2 | T4 |

FIG. 8C

Local Learned Host Entry Table – VTEP 3

| | | | |
|---|---|---|---|
| VM 3 MAC | VM 3 IP | VNI 1 | T3 |
| VM 4 MAC | VM 4 IP | VNI 2 | T4 |

Host-Specific Portion of Global Host Entry Table (HSPT) – VTEP 3

| | | | | |
|---|---|---|---|---|
| VM 1 MAC | VM 1 IP | VTEP 1 IP | VNI 1 | T1 |
| VM 2 MAC | VM 2 IP | VTEP 2 IP | VNI 2 | T2 |
| VM 3 MAC | VM 3 IP | VTEP 3 IP | VNI 1 | T3 |
| VM 4 MAC | VM 4 IP | VTEP 4 IP | VNI 2 | T4 |

FIG. 8D

Global Host Entry Table

| VM 1 MAC | VM 1 IP | VTEP 1 IP | VNI 1 | T1 |
| VM 2 MAC | VM 2 IP | VTEP 2 IP | VNI 2 | T2 |
| VM 3 MAC | VM 3 IP | VTEP 3 IP | VNI 1 | T3 |
| VM 4 MAC | VM 4 IP | VTEP 3 IP | VNI 2 | T4 |

FIG. 8E

Local Learned Host Entry Table – VTEP 2

| VM 2 MAC | VM 2 IP | VNI 2 | T2 |
|---|---|---|---|
| VM 3 MAC | VM 3 IP | VNI 3 | T5 |

Host-Specific Portion of Global Host Entry Table (HSPT) – VTEP 2

| VM 2 MAC | VM 2 IP | VTEP 2 IP | VNI 2 | T2 |
|---|---|---|---|---|
| VM 4 MAC | VM 4 IP | VTEP 4 IP | VNI 2 | T4 |
| VM 3 MAC | VM 3 IP | VTEP 2 IP | VNI 2 | T5 |
| VM 1 MAC | VM 1 IP | VTEP 1 IP | VNI 1 | T1 |

FIG. 8G

Global Host Entry Table

| VM 1 MAC | VM 1 IP | VTEP 1 IP | VNI 1 | T1 |
| --- | --- | --- | --- | --- |
| VM 2 MAC | VM 2 IP | VTEP 2 IP | VNI 2 | T2 |
| VM 3 MAC | VM 3 IP | VTEP 3 IP | VNI 1 | T3 |
| VM 4 MAC | VM 4 IP | VTEP 3 IP | VNI 2 | T4 |
| VM 3 MAC | VM 3 IP | VTEP 2 IP | VNI 2 | T5 |

FIG. 8H

Local Learned Host Entry Table – VTEP 1

| VM 1 MAC | VM 1 IP | VNI 1 | T1 |
|---|---|---|---|

Host-Specific Portion of Global Host Entry Table (HSPT) – VTEP 1

| VM 1 MAC | VM 1 IP | VTEP 1 IP | VNI 1 | T1 |
|---|---|---|---|---|
| VM 3 MAC | VM 3 IP | VTEP 3 IP | VNI 1 | T3 |
| VM 3 MAC | VM 3 IP | VTEP 2 IP | VNI 1 | T5 |

FIG. 8I

Local Learned Host Entry Table – VTEP 3

| VM 3 MAC | VM 3 IP | VNI 1 | T3 |
| --- | --- | --- | --- |
| VM 4 MAC | VM 4 IP | VNI 2 | T4 |

Host-Specific Portion of Global Host Entry Table (HSPT) – VTEP 3

| VM 1 MAC | VM 1 IP | VTEP 1 IP | VNI 1 | T1 |
| --- | --- | --- | --- | --- |
| VM 2 MAC | VM 2 IP | VTEP 2 IP | VNI 2 | T2 |
| VM 3 MAC | VM 3 IP | VTEP 3 IP | VNI 1 | T3 |
| VM 4 MAC | VM 4 IP | VTEP 4 IP | VNI 2 | T4 |
| VM 3 MAC | VM 3 IP | VTEP 2 IP | VNI 1 | T5 |

SYSTEM AND METHOD FOR SHARING VXLAN TABLE INFORMATION WITH A NETWORK CONTROLLER

BACKGROUND

In order to transmit packets over the network from a source to a destination, the packet may include sufficient information to route and/or bridge the packet between the various network devices between the source and destination. One such piece of information is the media access control (MAC) address of the destination. If the source does not have information about the MAC address of the destination, the source must request this information. Traditionally, IP multicast is used to flood packets to all destinations when more specific forwarding information, e.g., the destination MAC address is not known. However, the use of IP multicast requires the configuration and management of multicast groups.

SUMMARY

In general, in one aspect, the invention relates to a non-transitory computer readable medium comprising instructions, which when executed by a processor perform a method, the method comprising: making a first determination that a new locally learned host entry (NLHE) is present in a locally learned host entry table on a first virtual tunnel endpoint (VTEP), wherein the NLHE is associated with a first timestamp, and wherein the VTEP is executing on a network device; making a second determination that a first entry corresponding to the NLHE is present in a Host-Specific Portion of Global Host Entry Table (HSPT) on the first VTEP, wherein the first entry corresponding to the NLHE is associated with a second timestamp; based on the second determination, making a third determination, using the first timestamp and the second timestamp, that the NLHE is more recent than the first entry corresponding to the NLHE; based on the third determination: updating an active forwarding table on the first VTEP to include a second entry corresponding to the NLHE and to remove the first entry corresponding to the NLHE; sending the NLHE to a VXLAN controller operatively connected to the first VTEP.

In general, in one aspect, the invention relates to a system, comprising: a VXLAN controller comprising a global host entry table (GHET); a first VTEP operatively connected to the VXLAN controller and comprising a first locally learned entry table (LLET), a first active forwarding table (AFT), and a first Host-Specific Portion of Global Host Entry Table (HSPT); a second VTEP operatively connected to the VXLAN controller and comprising a second LLET, a second AFT, and a second HSPT; wherein the first VTEP is configured to: generate a first new locally learned host entry (NLHE) and populate the first LLET with the first NLHE; updating the first AFT to include a first entry corresponding to the first NLHE; and send the first NLHE to the VXLAN controller; wherein the VXLAN controller is configured to: update the GHET with a second entry corresponding to the first NLHE; obtain the first VXLAN network identified (VNI) from the first NLHE; determine that the second VTEP is associated with the first VNI; instruct the second VTEP to update the second HSPT with a third entry corresponding to the first NLHE; and wherein the second VTEP is configured to: update the second HSPT with the third entry; update the second AFT with a fourth entry corresponding to the first NLHE.

Other aspects of the invention will be apparent from the following description and the appended claims.

BRIEF DESCRIPTION OF DRAWINGS

FIG. 2A shows a Global Host Entry Table (GHET) in accordance with one or more embodiments of the invention.

FIG. 2B shows a Locally Learned Host Entry Table (LLHET) in accordance with one or more embodiments of the invention.

FIGS. 8A-8J show an example in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-8J, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for sharing VXLAN host entries between various virtual tunnel endpoints (VTEPs) in the network. More specifically, in one or more embodiments of the invention, each of the VTEPs is configured to locally learn host entries and convey the locally learned host entries to a VXLAN controller. The VXLAN controller may then, as appropriate, send corresponding host entries to other VTEPs in the system. One or more embodiments of the invention enables host entries on the various VTEPs to be shared without requiring the use of IP multicast protocols.

Figure 1A:
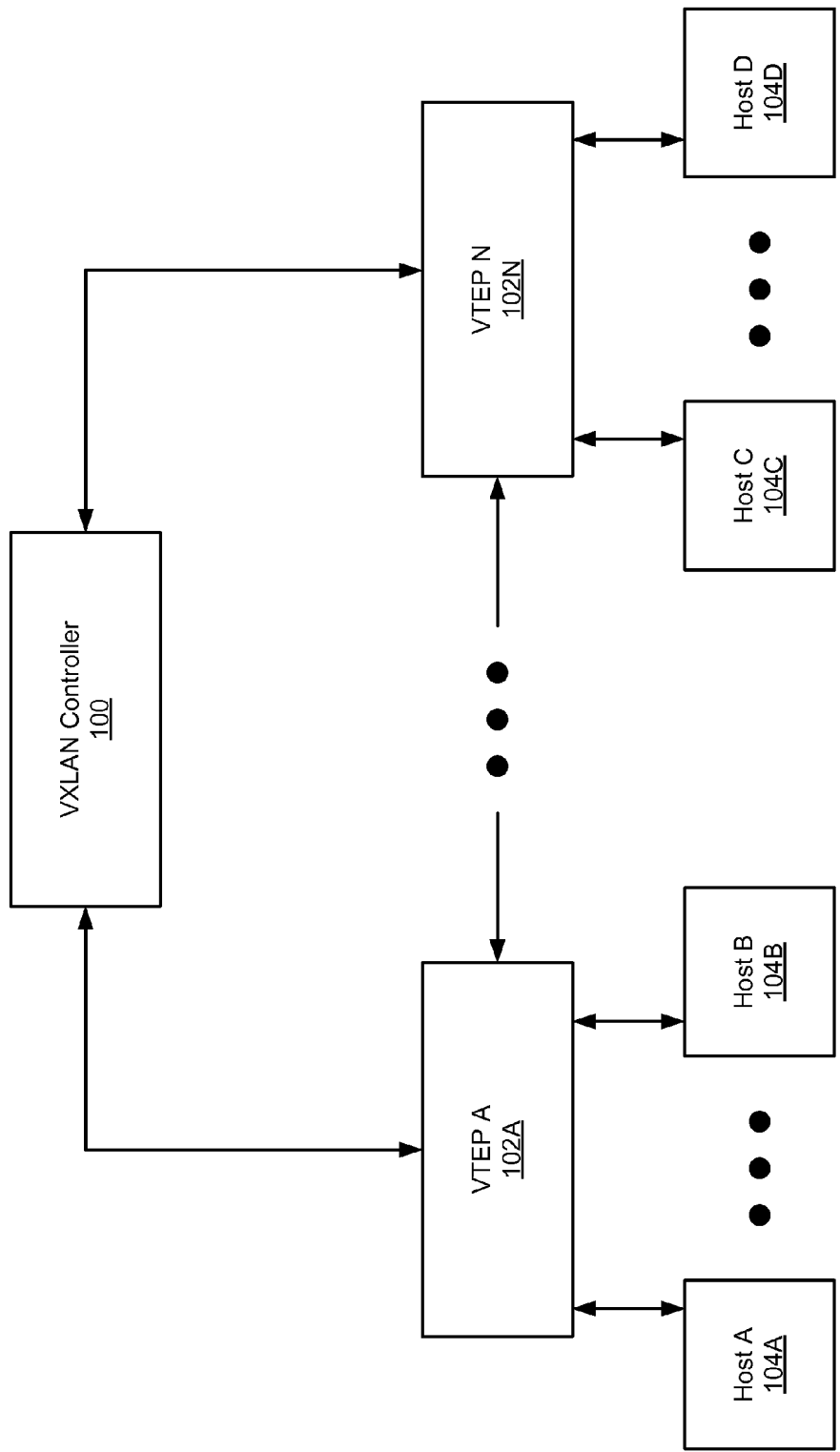
FIG. 1A shows a system in accordance with one or more embodiments of the invention.

FIG. 1A shows a system in accordance with one or more embodiments of the invention. In one embodiment of the invention, the system includes a VXLAN controller (100) operatively connected to two or more VTEPs (102A, 102N). Further, each of the VTEPs (102A, 102N) is operatively connected to one or more hosts (104A-104D). Each of these components is described below.

Figure 1B:
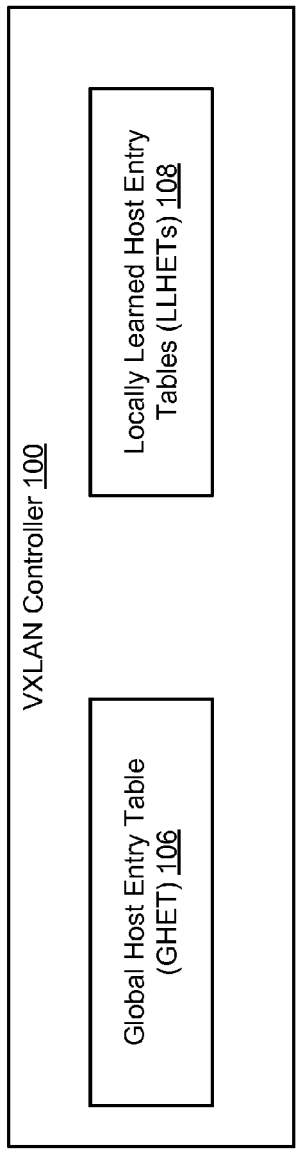
FIG. 1B shows a VXLAN controller in accordance with one or more embodiments of the invention.

In one embodiment of the invention, the VXLAN controller (100) includes functionality to maintain the global host entry table (106, see FIG. 1B) and the locally learned host entry tables (108) (see FIG. 1B). Further, the VXLAN controller (100) includes functionality to perform the method shown in FIG. 6. The VXLAN controller (100) may be implemented as a combination of software and storage (volatile and/or persistent storage). Alternatively, the VXLAN controller (100) may be implemented as a combination of hardware and storage (volatile and/or persistent storage). In another alternative, the VXLAN controller (100) may be implemented as a combination of hardware and software.

In one embodiment of the invention, the VXLAN controller (100) may be implemented on a server or a switch operatively connected to the VTEPs (102A, 102N). In another embodiment of the invention, the VXLAN controller (100) may be implemented on/in a virtual machine executing on a server or a switch operatively connected to the VTEPs (102A, 102N).

In one embodiment of the invention, each VTEP (102A, 102N) is associated with its own Internet Protocol (IP) address and its own media access control (MAC) address. Further, each VTEP (110, see FIG. 1C) includes functionality to maintain an active forwarding table (114, see FIG. 1C), a locally learned host entry table (116), and a Host-Specific Portion of the Global Host Entry Table (118, see FIG. 1C). Further, each VTEP includes functionality to perform the methods shown in FIGS. 4-5 and 7. In addition, each VTEP includes functionality to process received VXLAN packets in accordance with the VXLAN protocol.

Each VTEP (102A, 102N) may be implemented as a combination of software and storage (volatile and/or persistent storage). Alternatively, each VTEP (102A, 102N) may be implemented as a combination of hardware and storage (volatile and/or persistent storage). In another alternative, each VTEP (102A, 102N) may be implemented as a combination of hardware and software.

In one embodiment of the invention, one or more VTEPs (102A, 102N) are implemented on switches. In one embodiment of the invention, a switch is a physical device that includes persistent storage, memory (e.g., Random Access Memory), one or more processors, and two or more physical ports. Each port may be connected to either: (i) a computer system, or (ii) a network device. The computer system may include any type of system (including servers) that is configured to send and receive packets. The network device includes any device that is part of the network infrastructure such as a switch or a router. Each switch is configured to receive packets via the ports and determine whether to (i) drop the packet, or (ii) send the packet out over another one of the ports on the switch. How the switch makes the determination of whether to drop or send the packet depends on whether the switch is a layer-2 (L2) switch or a layer-3 (L3) switch (also referred to as multilayer switch). If the switch is operating as a L2 switch, the switch uses the destination media access control (MAC) address in the received packet along with the active forwarding table to determine out of which port to send the packet. If the switch is operating as a L3 switch, the switch uses the destination internet protocol (IP) address in the received packet along with a routing table to determine out of which port to send the packet.

Continuing with the discussion of FIG. 1A, each host (104A-104D) corresponds to a computer system (as described above) or to a virtual machine executing on a computer system. Regardless of the implementation, each host (104A-104D) includes functionality to (i) generate a MAC frame (see FIG. 3), (ii) issue address resolution protocol (ARP) requests, and (iii) receive ARP responses.

For simplicity, FIG. 1A does not show switches, router, servers, other hardware components and/or network devices, that are part of the network infrastructure; however, those skilled in the art will appreciate that the VTEPs (102A, 102N), VXLAN controller (100), and hosts (104A-104D) may be located within any network infrastructure that includes any combination of switches, routers, servers, other hardware components and/or network devices. Further, the invention is not limited to the system shown in FIG. 1A.

FIG. 1B shows a VXLAN controller (100) in accordance with one or more embodiments of the invention. The VXLAN controller (100) includes a global host entry table (GHET) (106) and locally learned host entry tables (LL-HETs) (108). The GHET (106) includes one or more global host entries (see FIG. 2A). In one embodiment of the invention, the GHET may only be populated with entries corresponding to the entries in the LLHETs (108) (see FIG. 6). Further, as entries are updated in the GHET, the VXLAN controller is configured to identify VTEPs that are impacted by the update to the GHET and to send the necessary information to these identified VTEPs (see FIG. 6) in order for these identified VTEPs to update their HSPT (118, FIG. 1C).

In one embodiment of the invention, the LLHETs (108) may correspond to a single table that includes the content of all locally learned tables on VTEPs to which the VXLAN controller is operatively connected. Alternatively, the LLHETs (108) may correspond to a set of tables, where there is one LLHET for each VTEP to which the VXLAN controller is operatively connected. Regardless of the implementation of the LLHETs (108), the LLHETs (108) are updated whenever an LLHET is updated on a VTEP. The VXLAN controller includes functionality to update the GHET whenever the LLHETs (108) is updated in accordance with FIG. 6. Accordingly, the GHET may not include entries corresponding to each of the entries in the LLHETs (108). Said another way, the update to the LLHETs (108) does not necessarily result in an update to the GHET.

Figure 1C:
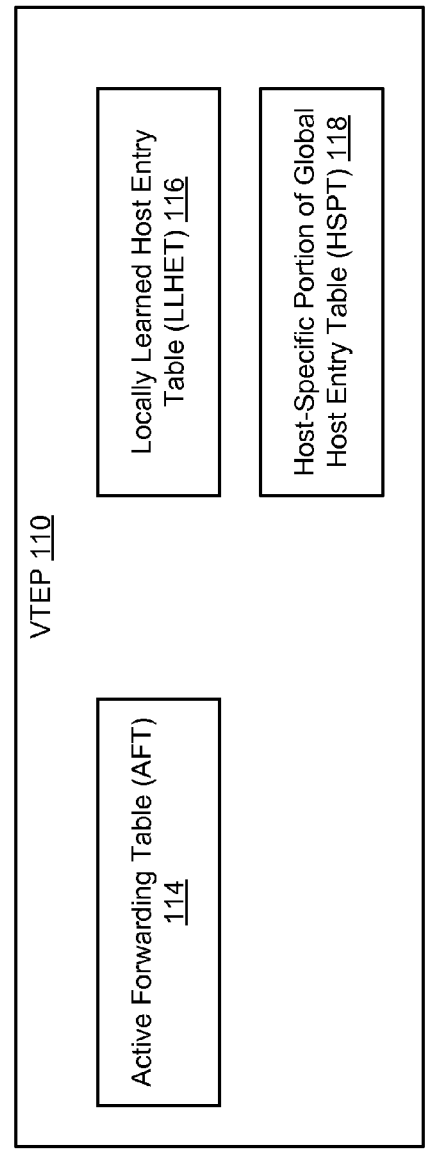
FIG. 1C shows a Virtual Tunnel Endpoint (VTEP) in accordance with one or more embodiments of the invention.

FIG. 1C shows a virtual tunnel endpoint (VTEP) in accordance with one or more embodiments of the invention. The VTEP includes a LLHET (116), an HSPT (118), and an active forwarding table (AFT) (114). The LLHET (116) only include entries directly learned by the VTEP (110). Said another way, the LLHET (116) only includes entries for hosts directly connected to the VTEP (110) and does not include entries corresponding to information received from the VXLAN controller (e.g., does not include entries based on information sent by the VXLAN controller in FIG. 6, Step 612). Further, the LLHET (116) may include multiple entries that have the same host MAC address and host IP address but different timestamps.

Figure 6:
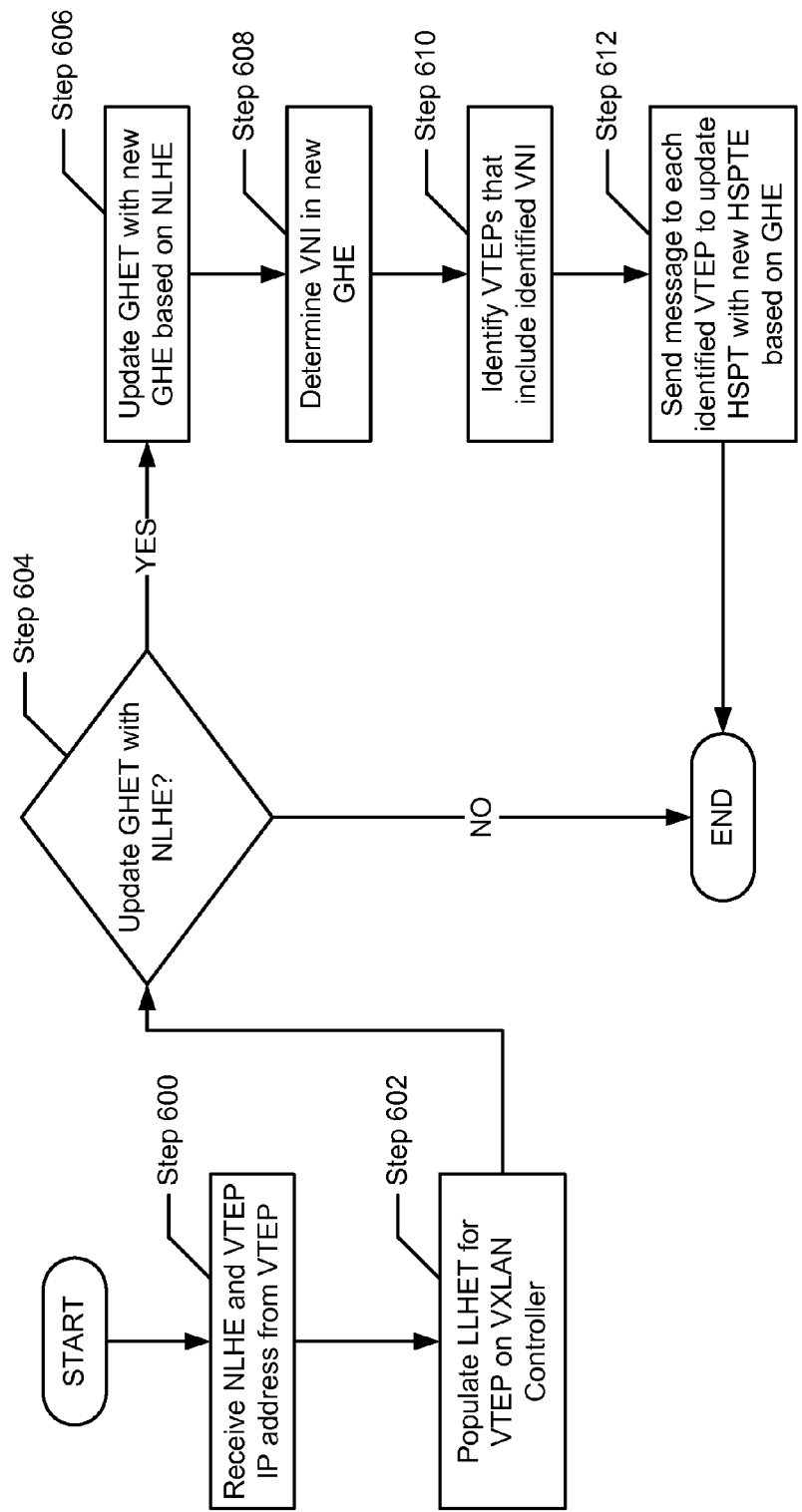
FIG. 6 shows a method for processing a new locally learned host table entry by a VXLAN controller in accordance with one or more embodiments of the invention.

In one embodiment of the invention, the HSPT (118) only includes entries based on information received from the VXLAN controller (see FIG. 6, step 612). Said another way, the HSPT (118) for a particular VTEP only includes the global host entries that include virtual network identifiers (VNIs) with which the particular VTEP is associated.

Figure 5:
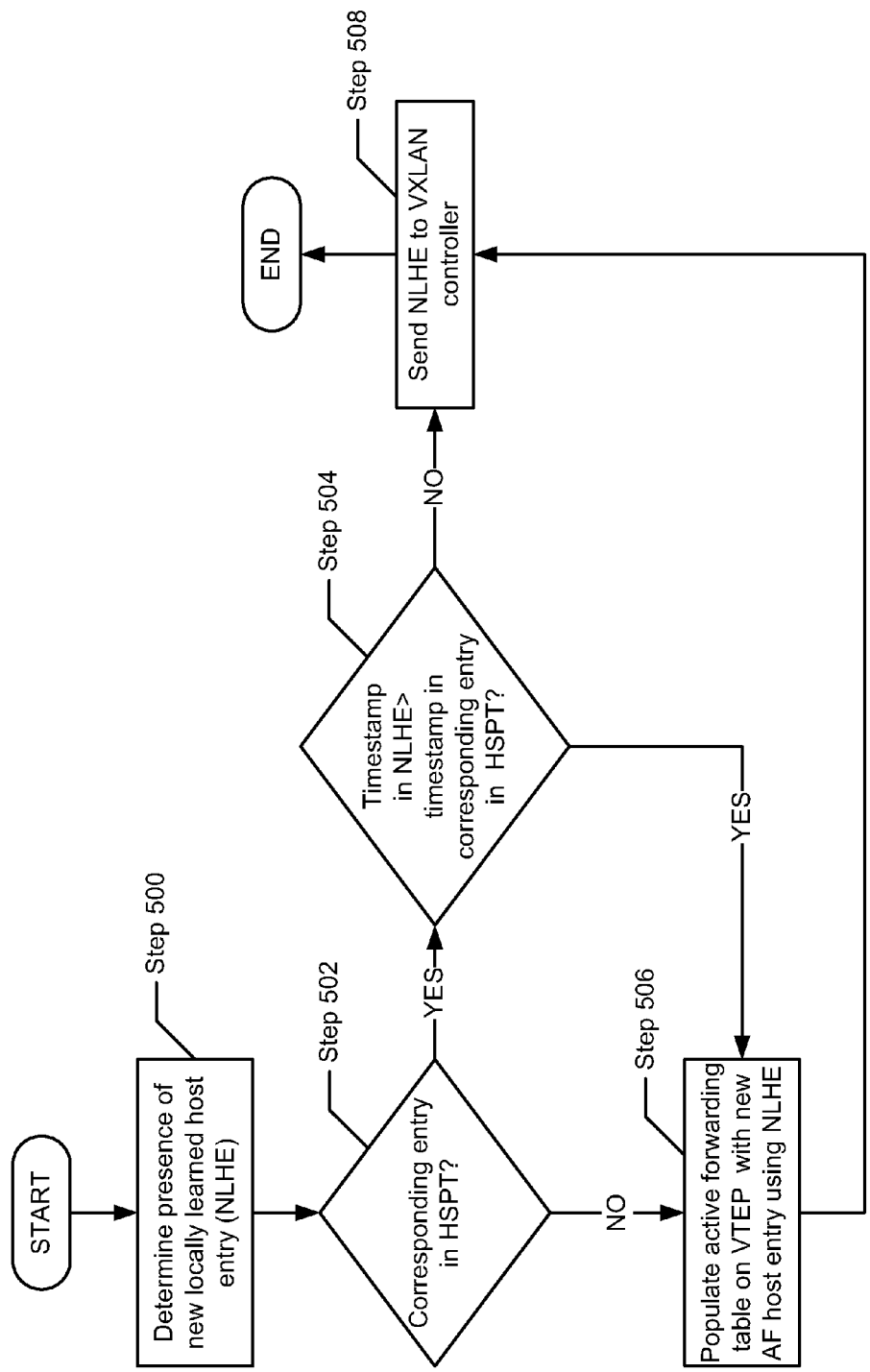
FIG. 5 shows a method for processing a new locally learned host table entry by a VTEP in accordance with one or more embodiments of the invention.

In one embodiment of the invention, the AFT (114) is populated by the VTEP using entries in the LLHET (116) and the HSPT (118) in accordance with FIG. 5. Further, the VTEP includes functionality to resolve any conflicts between the LLHET and the HSPT (described below). In one embodiment of the invention, the AFT (114) is used by the VTEP to generate VXLAN frames (see FIG. 3). The VTEP does not use entries from the LLHET or the HSPT to generate VXLAN frames. Further, the AFT (114) only includes one entry for each <Host MAC, Host IP address> pair.

FIG. 2A shows a global host entry table (GHET) in accordance with one or more embodiments of the invention. The GHET (200) includes one or more global host entries (202A, 202B). Each global host entry includes: (i) a host MAC address, (ii) a host IP address, (iii) a VTEP IP address, (iv) a VNI, and (v) a timestamp. The global host entries may include other information and/or information in a different order without departing from the invention.

FIG. 2B shows a locally learned host entry table in accordance with one or more embodiments of the invention. The locally learned host entry table (204) includes one or more locally learned host entries (206C, 206D). Each locally learned host entry includes: (i) a host MAC address, (ii) a host IP address, (iii) a VNI, and (iv) a timestamp. The locally learned host entries may include other information and/or information in a different order without departing from the invention. Though not shown in FIG. 2B, the locally learned host entry tables on the VXLAN controller include entries with the same or substantially the same content as the locally learned host entries shown in FIG. 2B.

Figure 2C:
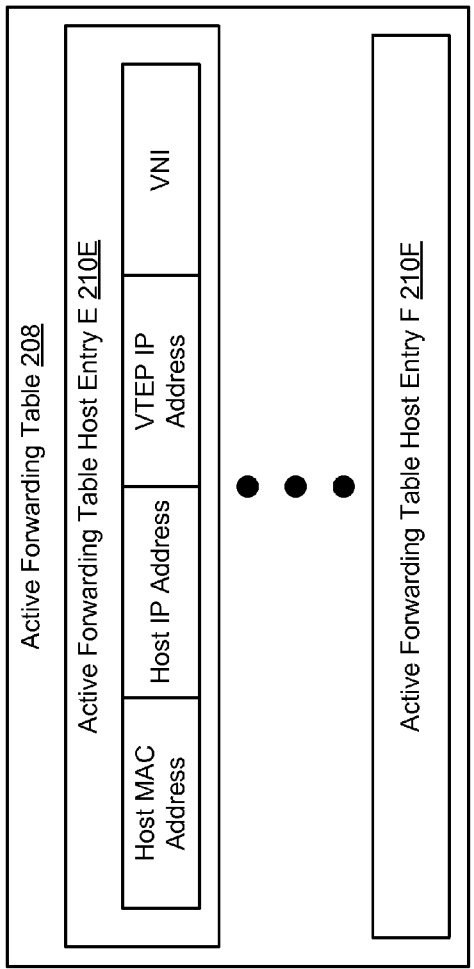
FIG. 2C shows an active forwarding table in accordance with one or more embodiments of the invention.

FIG. 2C shows an active forwarding table in accordance with one or more embodiments of the invention. The active forwarding table (208) includes one or more active forwarding table host entries (210E, 210F). Each active forwarding host table entry includes: (i) a host MAC address, (ii) a host IP address, (iii) a VTEP IP address, and (iv) a VNI. The active forwarding table host entries may include other information and/or information in a different order without departing from the invention.

Figure 2D:
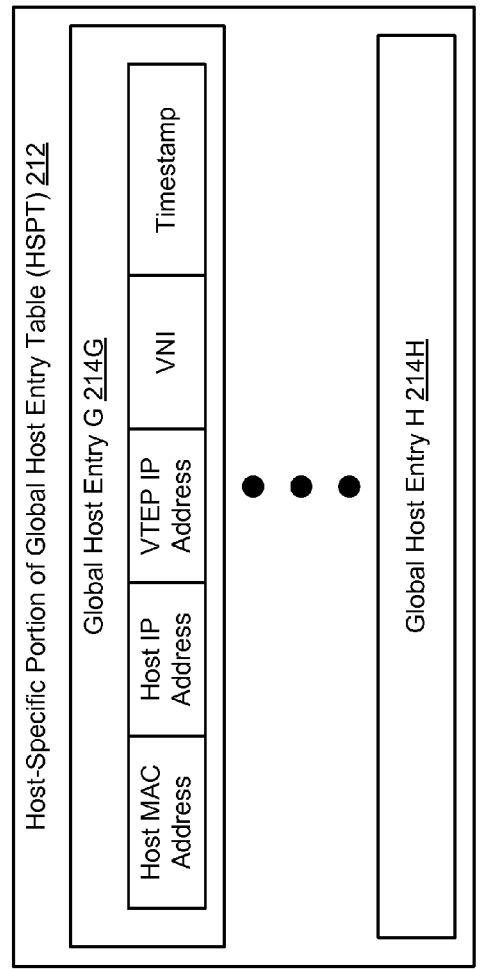
FIG. 2D shows a Host-Specific Portion of Global Host Entry Table (HSPT) in accordance with one or more embodiments of the invention.

FIG. 2D shows a Host-Specific Portion of Global Host Entry Table (HSPT) in accordance with one or more embodiments of the invention. The HSPT (212) includes one or more global host entries (214G, 214H). Each global host entry includes: (i) a host MAC address, (ii) a host IP address, (iii) a VTEP IP address, (iv) a VNI, and (v) a timestamp. The global host entries may include other information and/or information in a different order without departing from the invention.

Figure 3:
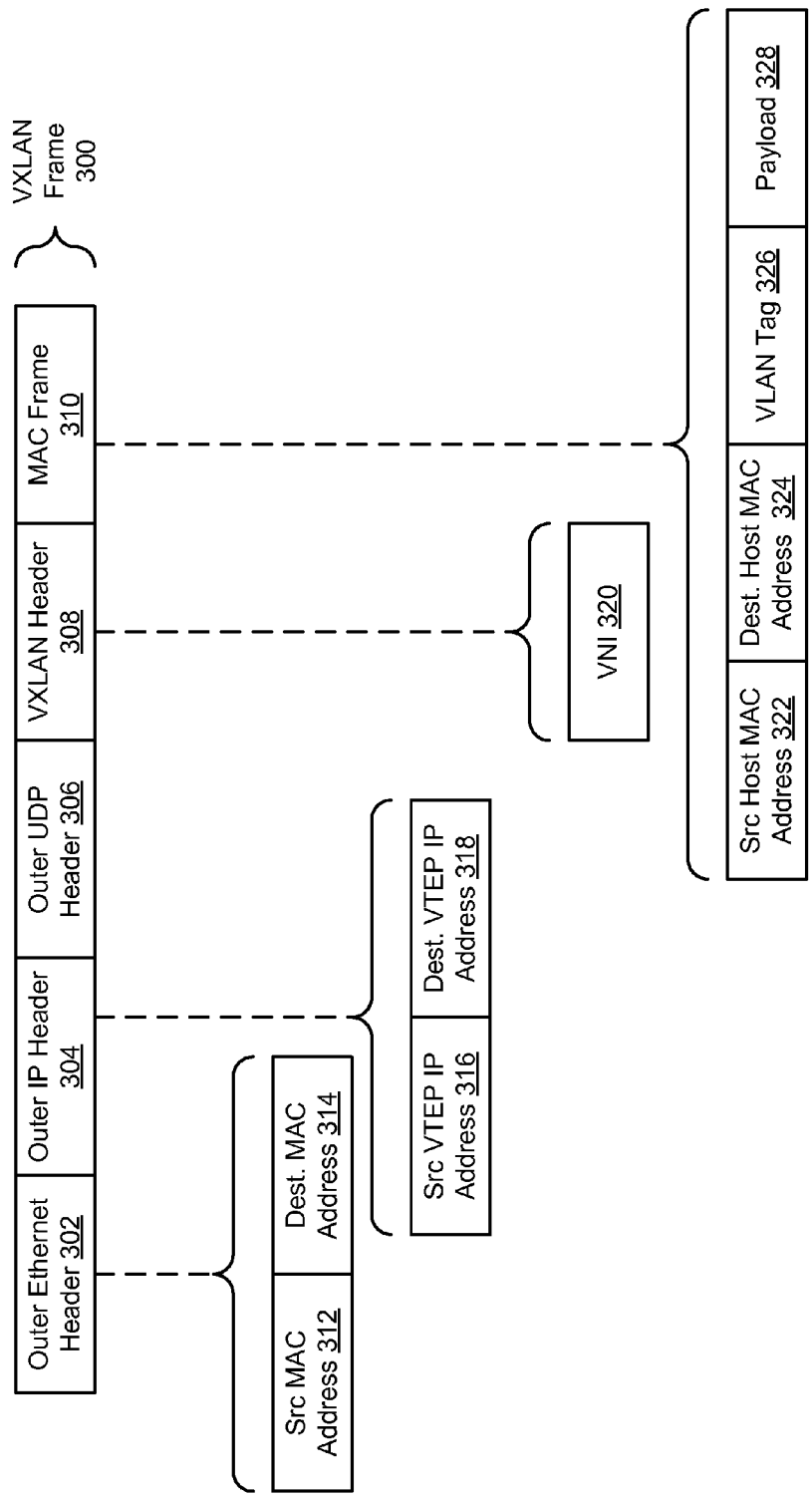
FIG. 3 shows a VXLAN frame in accordance with one or more embodiments of the invention.

FIG. 3 shows a VXLAN frame in accordance with one or more embodiments of the invention. The VXLAN frame (300) includes: (i) a MAC frame (310), (ii) a VXLAN header (308), (iii) an outer UDP header (306), (iv) an outer IP header (304), and (v) an outer Ethernet header (302). Each of the aforementioned components are described below.

In one embodiment of the invention, the MAC frame (310) is generated by a source host and may include (i) a source host MAC address (322), (ii) a destination host MAC address (324), a VLAN tag (326), and a payload (328). The VLAN tag (326) may or may not be included within the MAC frame. The VLAN tag is defined in accordance with IEEE 802.1Q. Further, the payload (328) may include the content that the source host is attempting to transmit to the destination host. The MAC frame may include other information/content without departing from the invention.

In one embodiment of the invention, the VXLAN header (308) may include, but is not limited to, a virtual network identifier (VNI). The VNI scopes the MAC frame (310) originated by the host such that the MAC frame (310) may only be received by destination hosts associated (via a VTEP) with the same VNI. The VXLAN header may include other information/content without departing from the invention.

In one embodiment of the invention, the outer Ethernet header (302), the outer IP header (304), and the outer UDP header (306) are used to route the VXLAN frame from the source VTEP to the destination VTEP. To this end, the outer Ethernet header (302) includes the source MAC address (312) and the destination MAC address (314) and the outer IP header (304) includes the source VTEP IP address (316) and the destination VTEP IP address (318). The aforementioned mentioned components may include other information/content without departing from the invention.

The VXLAN frame may include other components without departing from the invention.

While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 4-7 may be performed in parallel with any other steps shown in FIGS. 4-7 without departing from the invention.

Figure 4:
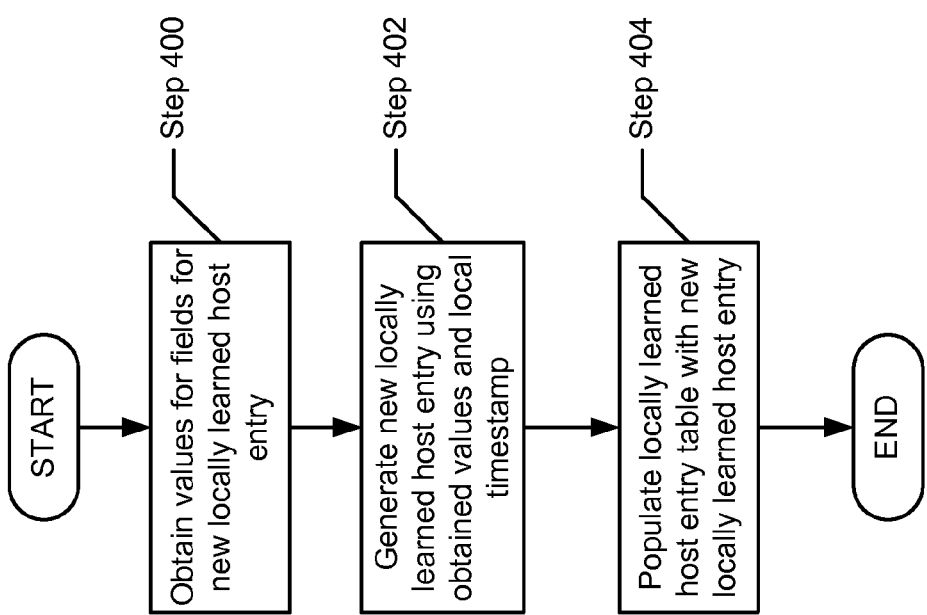
FIG. 4 shows a method for creating a locally learned host table entry in accordance with one or more embodiments of the invention.

FIG. 4 shows a method for creating a locally learned host table entry in accordance with one or more embodiments of the invention. The method shown in FIG. 4 may be performed each time the VTEP detects the presence of a new host to which it is connected. For example, the VTEP may determine the presence of a new host if it receives a MAC frame from a host where the VTEP has not previously received any MAC frames from this host. The VTEP may detect the presence of a new host using any other mechanism without departing from the invention.

In step 400, values for the fields/components for a new locally learned host entry are obtained (see 204, FIG. 2). The values for the aforementioned fields may be obtained, in part, from a MAC frame issued by the host (i.e., the host to which the new locally learned host entry corresponds). In one embodiment of the invention, the VTEP includes functionality to associate the VNI with the host, where this information is used to populate the new locally learned host entry. There are many ways to associate the VNI with the host. Examples of associating the VNI with the host include, but are not limited, (i) configuring the VTEP a mapping from ingress port to VNI such that when a MAC frame is received on the port, the LLHT is updated with an entry tagged with the VNI associated with the ingress port; (ii) configuring the ingress post associated with the VTEP as an 802.1q trunk and including a mapping (which may be global or per-port) from 802.1q tag to VNI, such that when a MAC frame is received on the port, the LLHT is updated with an entry tagged with the VNI associated with the 801.1q tag; and (iii)

using attributes in the packet header such as double tags (802.1ad, Q-in-Q or PBB), or other combinations of header fields (e.g., the IP SA subnet, or Ethernet protocol type) or, any other mechanism used in the art to map packets to VLANs may also be used to map packets to VNIs.

In step 402, a new locally learned host entry (NLHE) is generated using the values obtained in step 400 and a timestamp. The timestamp may correspond to the time the NLHE is created or when the VTEP first discovered the presence of the new host (thereby triggering the generation of the NLHE). In step 404, the locally learned host entry table on the VTEP is populated with the new NLHE.

FIG. 5 shows a method for processing a new locally learned host table entry by a VTEP in accordance with one or more embodiments of the invention. More specifically, FIG. 5 is performed by the VTEP when the locally learned host entry table is updated on the VTEP.

In step 500, the presence of a NLHE in the locally learned host entry table is determined. As discussed above, the determination in step 500 may be based on detecting that the locally learned host table on the VTEP has been updated.

In step 502, a determination is made about whether there is a corresponding entry in the HSPT on the VTEP. There is a corresponding entry in the HSPT when there is an entry in the HSPT that includes a <host MAC, Host IP>pair that matches the <host MAC, host IP>in the NLHE. If there is a corresponding entry in HSPT on the VTEP, then the process proceeds to step 504; otherwise the process proceeds to step 506.

In step 504, the timestamps of the NLHE and the corresponding entry in the HSPT are compared to determine whether the timestamp in the NLHE is later in time than the timestamp in the corresponding entry in the HSPT. Said another way, a determination is made about whether the NLHE is a newer entry (or more recent entry) than the corresponding entry in HSPT. If the NLHE is a newer entry (or more recent entry) than the corresponding entry in the HSPT, the process proceeds to step 506; otherwise the process proceeds to step 508.

In step 506, the active forwarding table on the VTEP is updated to (i) include an active forwarding table entry that corresponds to the NLHE and, if present, (ii) remove any prior active forwarding table entry that includes the <host MAC, host IP>pair. Task (ii) is preformed in the event that step 504 is performed prior to step 506.

In step 508, regardless of whether the active forwarding table is updated (per step 506), the NLHE (or information in the NLHE) is transmitted to the VXLAN controller. The VTEP may include its VTEP IP address as part of the information transmitted to the VXLAN controller.

FIG. 6 shows a method for processing a new locally learned host table entry by a VXLAN controller in accordance with one or more embodiments of the invention. More specifically, the method shown in FIG. 6 is performed upon receipt of the information transmitted by individual VTEPs when performed in Step 508.

In step 600, a copy of the NLHE (or information in the NLHE) and the VTEP IP address are received from the VTEP. In step 602, the locally learned host entry tables (LLHETs) (108 in FIG. 1B) is populated with a locally learned host table entry generated using the information received in step 600. Those skilled in the art will appreciate that if a copy of the NLHE is transmitted to the VXLAN controller then the copy of the NLHE may be used to directly update the global host entry table.

In step 604, a determination is made about whether to update the global host entry table. In one embodiment of the invention, the determination about whether to update the global host entry table is based on whether there is an entry corresponding to the NLHE in the global host entry table. If there is no entry corresponding to the NLHE in the global host entry table, then an update of the global host entry table is triggered. If there is an entry corresponding to the NLHE in the global host entry table then an update to the global host entry table is only triggered if the corresponding entry in the global host entry table is older than the NLHE (i.e., the NLHE has more update to information). If an update to the global host entry table is required, the process proceeds to step 606; otherwise, the process ends.

In step 606, the global host entry table is updated with a new global host entry table corresponding to the NLHE. In step 608, the VNI in the new global host entry (i.e., the global host entry generated in step 606) is determined. In step 610, the VXLAN controller identifies all VTEPs (which includes the VTEP that sent the NLHE (or information in the NLHE) to the VXLAN controller in step 600) in the network that are associated with the VNI (i.e., host connected to the VTEP communicate using the VNI).

In step 612, a message is sent to all identified VTEPs where the message instructs the VTEPs to update their HSPT to include a new HSPT entry based on the new global host entry (i.e., the global host entry generated in step 606).

Those not shown in FIG. 6, once the HSPT is updated on a given VTEP, the VTEP makes a determination about whether to update the active forwarding table using information in the newly generated HSPT entry. The active forwarding table is updated if there is no entry corresponding to the new HSPT entry in the active forwarding table.

The active forwarding table may also be updated if there is an entry corresponding to the new HSPT entry in the active forwarding table and the timestamp of the new HSPT entry is later in time than a timestamp of an entry corresponding to the new HSPT entry in the locally learned table. For example, consider the scenario in which Host 1 is a virtual machine that is initially "learned" by VTEP 1. Accordingly, VTEP 1 includes a locally learned entry for Host 1, a HSPT entry for Host 1, and an active forwarding table entry for Host 1. Assume at a later point in time Host 1 is migrated to a new server and, for purposes of this example is denoted as Host 1'. Host 1' is subsequently "learned" by VTEP 2. As a result, VTEP 2 includes a locally learned entry for Host 1', a HSPT entry for Host 1', and an active forwarding table entry for Host 1'. In addition, a HSPT entry for Host 1' is created on VTEP 1 (in accordance with FIG. 6 described above). Once the HSPT entry for Host 1' is created on VTEP 1, a determination is made about whether the active forwarding table on VTEP 1 should be updated. In this example, (i) there is a Host 1 entry that exists in the active forward table, and (ii) the timestamp of the locally learned host entry for Host 1 is older than the timestamp of the HSPT entry for Host 1'. Accordingly, the active forwarding table is updated to remove the entry corresponding to Host 1 and to include an entry corresponding to Host 1'.

Figure 7:
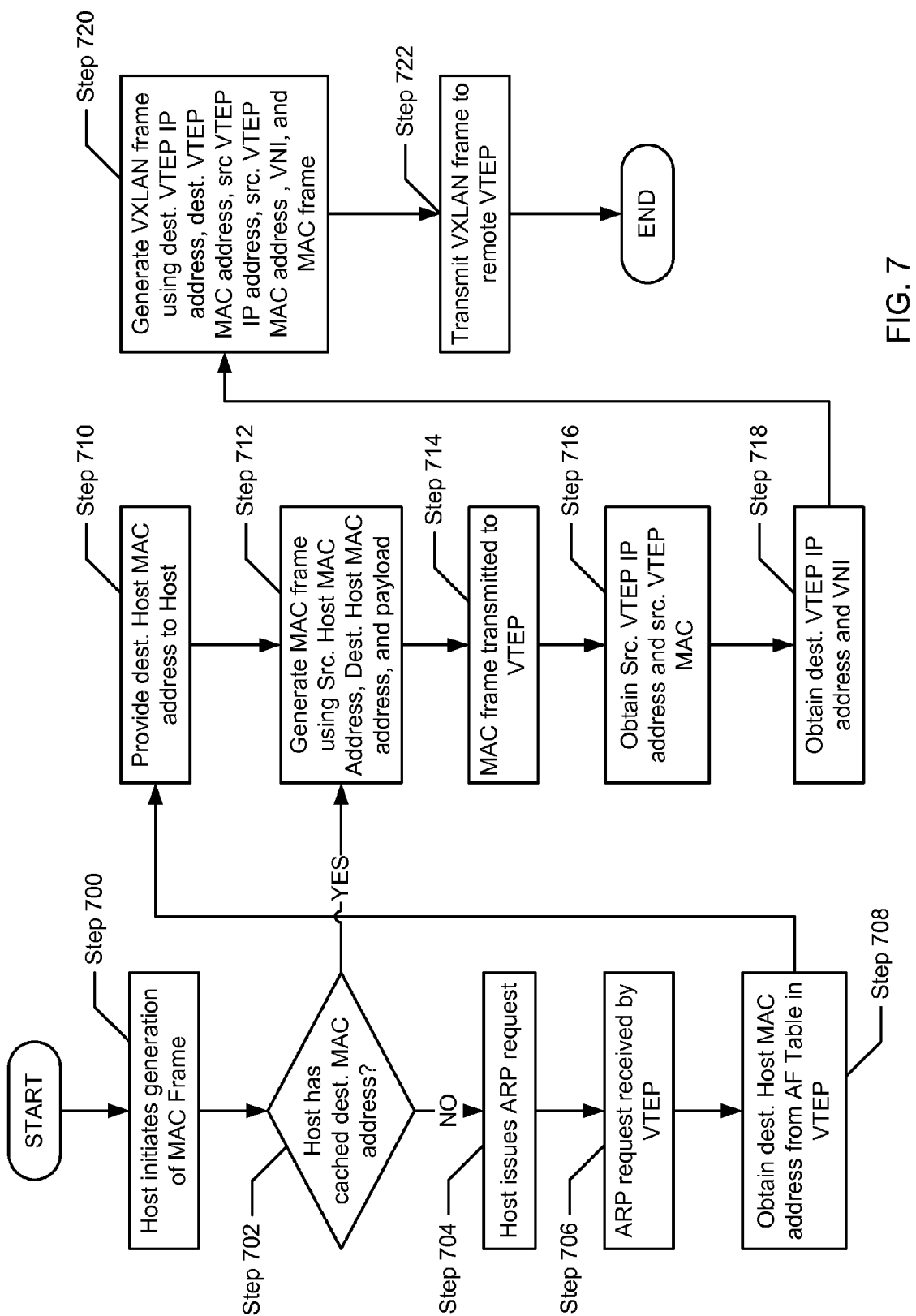
FIG. 7 shows a method for generating and transmitting a VXLAN frame in accordance with one or more embodiments of the invention.

FIG. 7 shows a method for generating and transmitting a VXLAN frame in accordance with one or more embodiments of the invention. More specifically, FIG. 7 shows a method for using the active forwarding table by a VTEP in order to enable a host to communicate with another host on the network using VXLAN.

In step 700, a host initiates the generation of a MAC frame. At this stage, the host knows the IP address of the destination host. In step 702, a determination is made about whether the destination host MAC address is present in a cache (or other storage medium) on the host or server on which the host is executing. If the destination host MAC address is present in a cache, the process proceeds to step 712. Otherwise, the process proceeds to Step 704.

In step 704, the host issues an Address Resolution Protocol (ARP) request that includes the destination host IP address. In step 706, the ARP request is received by the VTEP. More specifically, the ARP request is intercepted by the VTEP. In step 708, the destination host IP address is used to identify the destination MAC address using the active forwarding table. In order for the source host and the destination host to communicate, the source host and the destination host must both be associated with the same VNI. If they are not associated with the same VNI then the VTEP does not return the destination host MAC address to the source host in response to the ARP request and the process ends (not shown). Assuming that the source host and the destination host are associated with the same VNI, the process proceeds to step 710. In step 710, the destination host MAC address is provided to the host as part of an ARP reply.

In step 712, the source host generates a MAC frame that includes the source host MAC address, the destination host MAC address, and the payload. In step 714, the MAC frame is transmitted from the host to the VTEP. In step 716, the source VTEP IP address and the source VTEP MAC address are obtained from the VTEP. In step 718, the VTEP uses the <destination host MAC address, destination host IP address> pair to identify an entry in the active forwarding table on the VTEP. The VTEP IP address in the entry corresponds to the destination VTEP IP address. Further, the VTEP IP address is used by a routing function (and corresponding routing table(s)) to determine the next hop in the path between the source VTEP and the destination VTEP. Once the next hop is identified, the MAC address of the next host is determined.

In step 720, a VXLAN frame is generated using the aforementioned information in accordance with the VXLAN protocol a version of which is defined in the document entitled "VXLAN: A Framework for Overlaying Virtualized Layer 2 Networks over Layer 3 Networks" version 04 dated May 2013. The VXLAN protocol is hereby incorporated by reference in its entirety. The invention is not limited to a particular version of VXLAN. Returning to FIG. 7, specifically, in the generated VXLAN frame, the source MAC address (312 in FIG. 3) is the source VTEP MAC address, the destination MAC address (314 in FIG. 3) is the MAC address of the next hop, the source VTEP IP address (316 in FIG. 3) is the IP address of the source VTEP, the destination VTEP IP address (318 in FIG. 3) is the VTEP IP address obtained from the entry in the active forwarding table in step 718, and the VNI (320 in FIG. 3) is obtained from the entry in the active forwarding table (in step 718).

In step 722, the VXLAN frame is routed to the destination VTEP. Though not shown in FIG. 7, upon receipt of the VXLAN frame by the destination VTEP, the destination VTEP extracts the MAC frame from the VXLAN frame and then uses the information in the MAC frame (see FIG. 3) to bridge the MAC frame to the destination host.

FIGS. 8A-8J show an example in accordance with one or more embodiments of the invention. The example is not intended to limit the scope of the invention.

Figure 8A:
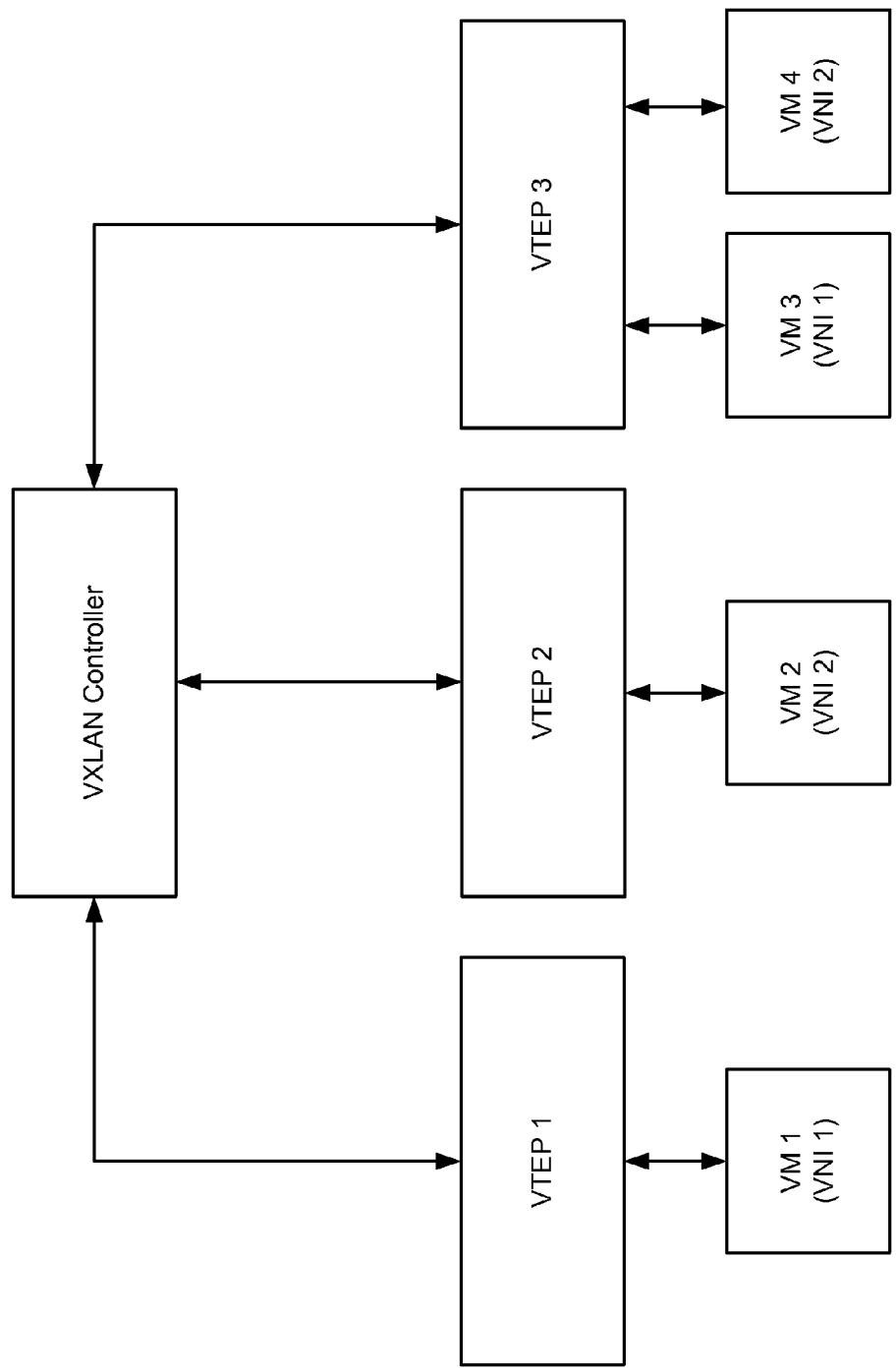

Referring to FIG. 8A, consider a scenario in which the network infrastructure includes a VXLAN controller operatively connected to three VTEPs (VTEP 1-VTEP 3). Specifically, (i) VTEP is connected to VM 1, which is associated with VNI 1, (ii) VTEP 2 is connected to VM 2, which is associated with VNI 2, and (iii) VTEP 3 is associated with VM 3, which is associated with VNI 1, and VM 4 which is associated with VNI 2.

Referring to FIG. 8B, FIG. 8B shows the locally learned host entry table for VTEP 1 and the HSPT for VTEP 1. As shown in FIG. 8B, VTEP 1 locally learns VM 1 and populates the locally learned host entry table for VTEP 1 with a corresponding entry. In addition, per the method in FIG. 6, the HSPT in VTEP 1 is populated with an entry for VM 1 and an entry for VM 3 (which is not locally learned by VTEP 1 but has a VNI with which VTEP 1 is associated). Similarly, as shown in FIG. 8C, VTEP 2 locally learns VM 2 and populates the locally learned host entry table for VTEP 2 with a corresponding entry. In addition, per the method in FIG. 6, the HSPT in VTEP 2 is populated with an entry for VM 2 and an entry for VM 4 (which is not locally learned by VTEP 2 but has a VNI with which VTEP 2 is associated).

Further, as shown in FIG. 8D, VTEP 3 locally learns VM 3 and VM 4 and populates the locally learned host entry table for VTEP 3 with corresponding entries. In addition, per the method in FIG. 6, the HSPT in VTEP 3 is populated with an entry for each of VM 3 and VM 4. The HSPT in VTEP is also populated with entries for VM 1 and VM 2 (which are not locally learned by VTEP 3 but have VNIs with which VTEP 3 is associated). Finally, referring to FIG. 8E, FIG. 8E shows the current state of the global host entry table. The global host entry table includes one entry for each of VM 1-VM 4.

Figure 8F:
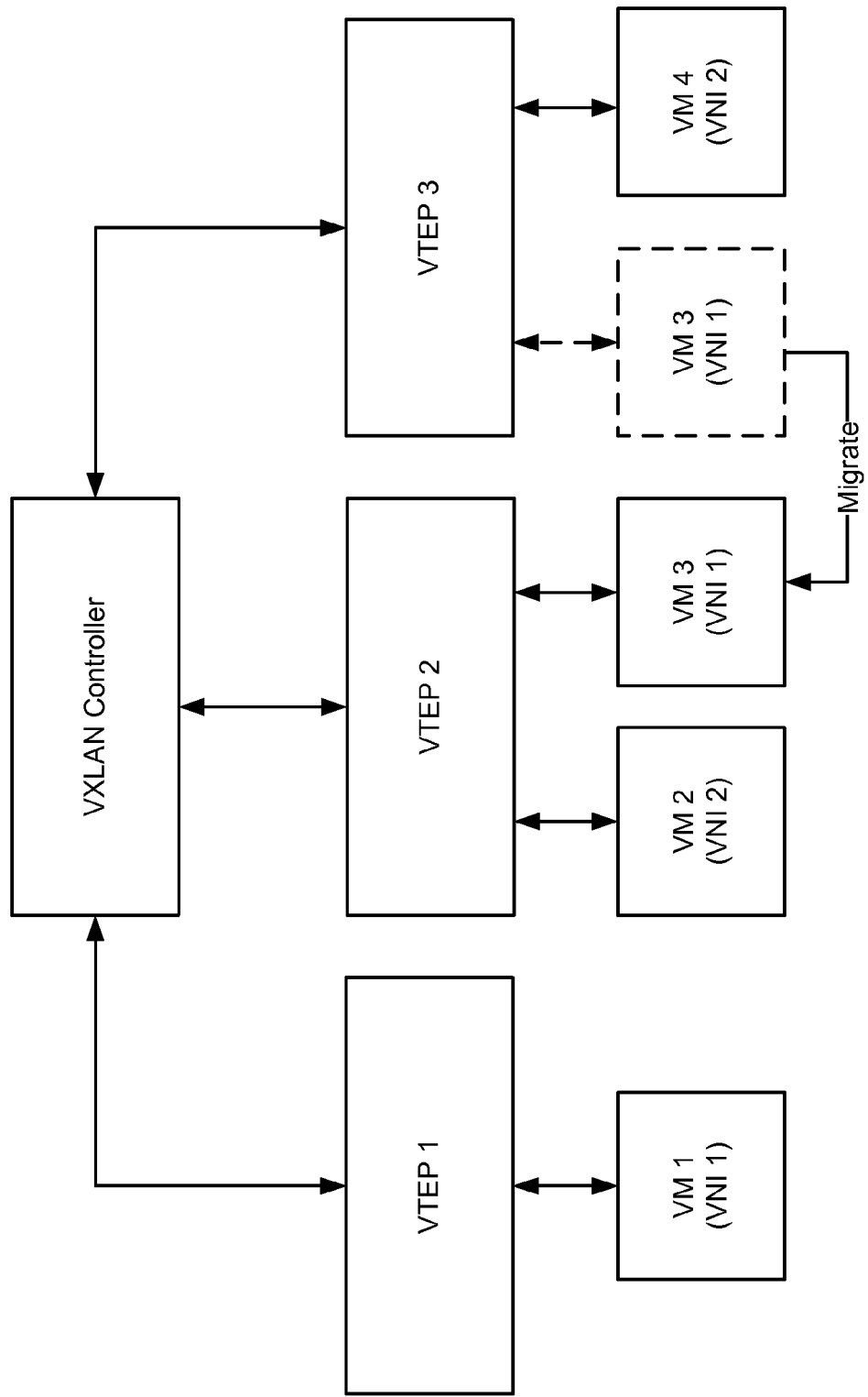

Continuing with the example and referring to FIG. 8F, consider the scenario in which VM 3 is migrated such that it is now connected to VTEP 2. Referring to FIG. 8G, in this scenario, VTEP 2 locally learns VM 3 and populates its locally learned host entry table with a corresponding entry for VM 3. Further, per the method in FIG. 6, the HSPT in VTEP 2 is populated with an entry for VM 3 and an entry for VM 1. With respect to the entry for VM 1, because VTEP 2 is now associated with VNI 1, the HSPT is populated with entries (in the event that they are not already present) for all hosts associated with VNI 1. The VXLAN controller may provide VTEP 2 with information necessary to generate the aforementioned entries in the HSPT; alternatively, the HSPT may provide the entries to VTEP 2 to directly include in the HSPT.

The migration of VM 3 also triggers updates in the VXLAN controller and the other VTEPs. Specifically, referring to FIG. 8H, the global host entry table is updated to remove the older entry for VM 3 (with timestamp T3) and include a new entry for VM 3 (with timestamp T5). Further, while the locally learned host entry table for VTEP 1 is not impacted by the migration, the HSPT in VTEP 1 is updated to remove the older entry for VM 3 (with timestamp T3) and include a new entry for VM 3 (with timestamp T5).

Finally, referring to FIG. 8J, while the locally learned host entry table for VTEP 3 is not impacted by the migration, the HSPT in VTEP 3 is updated to remove the older entry for VM 3 (with timestamp T3) and to include a new entry for VM 3 (with timestamp T5).

Though not shown in FIGS. 8A-8J, the active forwarding table for VTEP 1 is updated to remove the old entry for VM 3 and add a new entry for VM 3 with the updated information that reflects the new location of VM 3. Further, the active forwarding table for VTEP 2 is updated to remove the old entry for VM 3. Finally, the active forwarding table for VTEP 3 is updated a new entry for VM 3 with the updated information that reflects the new location of VM 3.

While the invention has been described with respect to VTEPs executing on switches, embodiments on the invention may be implemented by other network devices without departing from the invention.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
   making a first determination that a new locally learned host entry (NLHE) is present in a locally learned host entry table on a first virtual tunnel endpoint (VTEP), wherein the NLHE is associated with a first timestamp and a host and comprises a first virtual extensible local area network (VXLAN) network identifier (VNI) associated with the first VTEP, and wherein the first VTEP is executing on a network device;
   making a second determination that a first entry corresponding to the NLHE is present in a Host-Specific Portion of Global Host Entry Table (HSPT) on the first VTEP, wherein the first entry corresponding to the NLHE is associated with a second timestamp;
   based on the second determination, making a third determination, using the first timestamp and the second timestamp, that the NLHE is more recent than the first entry corresponding to the NLHE;
   based on the third determination:
      updating an active forwarding table on the first VTEP to include a second entry corresponding to the NLHE and comprising the first timestamp, and to remove from the active forwarding table an older entry corresponding to the host;
      sending the NLHE to a VXLAN controller operatively connected to the first VTEP
   receiving, from the VXLAN controller, a fourth entry corresponding to a global host entry of a global host entry table of the VXLAN controller, wherein the fourth entry comprises the first VNI, and wherein the fourth entry corresponds to a second NLHE locally learned by a second VTEP;
   populating the HSPT with the fourth entry; and
   updating the active forwarding table to include a fifth entry corresponding to the fourth entry when an entry corresponding to the fourth entry is not present in the active forwarding table.

2. The non-transitory computer readable medium of claim 1, the method further comprising:
   receiving from the VXLAN controller a third entry corresponding to a second global host entry of the global host entry table of the VXLAN controller, wherein the second global host entry corresponds to the NLHE sent to the VXLAN controller;
   populating the HSPT with the third entry; and
   removing the first entry from the HSPT.

3. The non-transitory computer readable medium of claim 1, wherein the network device is a switch.

4. The non-transitory computer readable medium of claim 1, wherein the locally learned host entry table is only populated with entries learned by the first VTEP.

5. The non-transitory computer readable medium of claim 4, wherein each of the entries in the locally learned host entry table comprises a host media access control (MAC) address, a host Internet Protocol (IP) address, a VXLAN network identifier (VNI), and a timestamp, wherein each of the entries does not include an IP address of the first VTEP.

6. The non-transitory computer readable medium of claim 1, wherein the HSPT is only populated with entries obtained from the VXLAN controller.

7. The non-transitory computer readable medium of claim 6, wherein each of the entries in the HSPT comprises a host media access control (MAC) address, a host Internet Protocol (IP) address, an IP address of the first VTEP, and a VXLAN network identifier (VNI).

8. The non-transitory computer readable medium of claim 1, wherein the host is a virtual machine executing on a server directly connected to the network device.

9. The non-transitory computer readable medium of claim 1, wherein the first entry corresponds to the host, and wherein the first entry comprises a host media access control (MAC) address, a host Internet Protocol (IP) address, and the first VNI, and the NLHE further comprises the host MAC address and the host IP address.

10. A system, comprising:
    a virtual extensible local area network (VXLAN) controller comprising a global host entry table (GHET);
    a first virtual tunnel endpoint (VTEP) operatively connected to the VXLAN controller and comprising a first locally learned entry table (LLET), a first active forwarding table (AFT), and a first Host-Specific Portion of Global Host Entry Table (HSPT);
    a second VTEP operatively connected to the VXLAN controller and comprising a second LLET, a second AFT, and a second HSPT;
    wherein the first VTEP is configured to:
       generate a first new locally learned host entry (NLHE) comprising a first VXLAN network identifier (VNI) associated with the first VTEP and populate the first LLET with the first NLHE;
       updating the first AFT to include a first entry corresponding to the first NLHE; and
       send the first NLHE to the VXLAN controller;
    wherein the VXLAN controller is configured to:
       update the GHET with a second entry corresponding to the first NLHE;
       obtain the first VNI from the first NLHE;
       determine that the second VTEP is associated with the first VNI;
       instruct the second VTEP to update the second HSPT with a third entry corresponding to the first NLHE; and
    wherein the second VTEP is configured to:
       obtain the third entry corresponding to the first NLHE;
       update the second HSPT with the third entry;
       update the second AFT with a fourth entry corresponding to the first NLHE.

11. The system of claim 10,
    wherein the second VTEP is further configured to:
       generate a second NLHE comprising a second VNI associated with the second VTEP and populate the second LLET with the second NLHE;
       send the second NLHE to the VXLAN controller;
    wherein the VXLAN controller is further configured to:

update the GHET with a fifth entry corresponding to the second NLHE;

obtain the second VNI from the second NLHE;

determine that the first VTEP is not associated with the second VNI, wherein based on the determination that the first VTEP is not associated with the second VTEP, not instructing the first VTEP to update the first HSPT with a sixth entry corresponding to the second NLHE.

12. The system of claim 10, wherein the first NLHE does not include a VTEP Internet Protocol (IP) address, wherein the VTEP IP address is provided, in addition to the first NLHE, when the first NLHE is sent to the VXLAN controller.

13. The system of claim 10, wherein the first AFT is updated to include a first entry corresponding to the first NLHE when no entry comprising a host media access control (MAC) address, a host Internet Protocol (IP) address, and the first VNI is present in the first AFT, wherein the first NLHE further comprises the host MAC address and the host IP address.

14. The system of claim 10, wherein the first AFT is updated to include the first entry corresponding to the first NLHE when a first entry comprising a first timestamp and corresponding to the first NLHE is present in the first HSPT and the first NLHE comprises a second timestamp, wherein the first NLHE is more recent than the first entry based on a comparison of the first timestamp and the second timestamp.

15. The system of claim 10, wherein the first VTEP is executing on a first switch and the second VTEP is executing on a second switch.

16. The system of claim 10, wherein the VXLAN controller is executing on a virtual machine.

* * * * *